(12) United States Patent
Kounavis

(10) Patent No.: US 12,229,321 B1
(45) Date of Patent: Feb. 18, 2025

(54) HIDING BIG DATA ACCESS PATTERNS

(71) Applicant: META PLATFORMS, INC., Menlo Park, CA (US)

(72) Inventor: Michael Kounavis, Scarsdale, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 121 days.

(21) Appl. No.: 18/154,106

(22) Filed: Jan. 13, 2023

(51) Int. Cl.
*G06F 21/64* (2013.01)
*G06F 16/22* (2019.01)
*G06F 21/60* (2013.01)

(52) U.S. Cl.
CPC .......... *G06F 21/64* (2013.01); *G06F 16/2228* (2019.01); *G06F 21/604* (2013.01)

(58) Field of Classification Search
CPC ..... G06F 21/64; G06F 21/604; G06F 16/2228
See application file for complete search history.

(56) References Cited

U.S. PATENT DOCUMENTS 10,078,758 B1 * 9/2018 Hanna ............... G06F 16/23
2018/0239920 A1 * 8/2018 Gupta ............... G06F 21/6218

OTHER PUBLICATIONS

Grubbs P., et al., "Pancake: Frequency Smoothing for Encrypted Data Stores," USENIX Security Symposium, Aug. 12-14, 2020, pp. 2451-2468.

* cited by examiner

*Primary Examiner* — Thaddeus J Plecha
(74) *Attorney, Agent, or Firm* — BakerHostetler

(57) ABSTRACT

Methods, systems, and apparatuses for disguising or otherwise hiding big data access patterns and frequencies may include a replica being directly obtained from a key and a replica index, based on applying a pseudorandom permutation or pseudorandom function. Data object access frequencies may be quantized so that the ratios of quantized data object access frequencies are rational numbers of integers, which may allow for a uniform distribution of data object accesses. Fake accesses may be implemented by simulating an access schedule produced by a cryptographic primitive and by performing a greedy mapping between the real data object accesses and simulated data object accesses.

20 Claims, 9 Drawing Sheets

HIDING BIG DATA ACCESS PATTERNS

TECHNOLOGICAL FIELD

Examples in this disclosure relate generally to methods, apparatuses, or computer program products for hiding big data access patterns and frequencies.

BACKGROUND

Adversaries may have the ability to monitor access patterns and infer sensitive information. Such sensitive information may include the learned embeddings of ads ranking models, data about user impressions and clicks, or user history embeddings, among other things. Although integrity and confidentiality techniques (e.g., modes for authenticated encryption) may effectively conceal data and help with detecting corruption, such techniques may not hide the frequencies of accesses to data or other temporal aspects of access patterns.

SUMMARY

Disclosed herein are methods, apparatuses, or systems for disguising or otherwise hiding big data access patterns and frequencies. In an example, each replica may be directly obtained from a key (e.g., the original content ID) and a replica index by applying a pseudorandom permutation or pseudorandom function. This may reduce the amount of storage needed for replica addresses. In another example, data object access frequencies may be quantized so that the ratios of quantized data object access frequencies are rational numbers or integers and there may be a uniform distribution of data object accesses. Furthermore, additional fake accesses may be implemented by simulating an access schedule produced by a cryptographic primitive and by performing a greedy mapping between the real data object accesses and simulated data object accesses.

In another example, an apparatus may include one or more processor and memory. The memory may be coupled with the one or more processors and store executable instructions that when executed by the one or more processors cause the one or more processors to effectuate operations comprising receiving a frequency number for an initial data object access within a period; based on the frequency number, determine a number of replicas associated with the first data object; obtaining a replica index based on a random number; appending the replica index to the key to create replica-key identifier (ID); creating a bit string based on the replica-key ID; and based on the bit string, performing a lookup on data structure.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

The figures depict various examples for purposes of illustration only. One skilled in the art will readily recognize from the following discussion that alternative examples of the structures and methods illustrated herein may be employed without departing from the principles described herein.

DETAILED DESCRIPTION

Entities (e.g., adversaries) may operate using hardware or software and connect with a computing infrastructure to monitor memory accesses among other things. Conventionally there are ways of encrypting memory which may conceal information accessed on a computing device. Although, conventionally, an adversary may not be able to read the information accessed, the adversary may actually observe patterns (e.g., frequencies for accessing the content). In an example, a data object A may be accessed 4 times, and a data object B may be accessed 11 times. An adversary may infer that data object B holds significant content (e.g., a hot spot). The inference may indicate the location of frequently accessed embeddings of a machine learning system and therefore a cyber-attack (e.g., denial of service attack) may be directed to the location.

To address the aforementioned issues, there may be smoothening of access patterns by replicating the most frequent data or by intermittently introducing fake accesses. A fake access may be considered an access that is a false access which may be created that is not used in the functional operation of a device or use of a machine learning algorithm. A fake access may be used to provide a perception that the accesses was used to help a device or function (e.g., machine learning or artificial intelligence function) operate. Conventional systems try to address such issues, but each piece of data requires a special private memory for storing the addresses of the data's replicas. Such additional private memory can be large. In addition, the effort to protect accesses to such memory may be as significant as the effort to support the conventional system in the first place. Furthermore, conventional systems may not effectively smoothen frequencies, and convert them to numbers or replicas, such as when frequency ratios are not integers or rational numbers.

The disclosed subject matter may address one or more of the aforementioned issues, while providing security or privacy of computing workloads, such as machine learning workloads. If an adversary is able to observe access patterns, the disclosed subject matter may make inferring information about accessed content more difficult, while remaining relatively lightweight.

Figure 1:
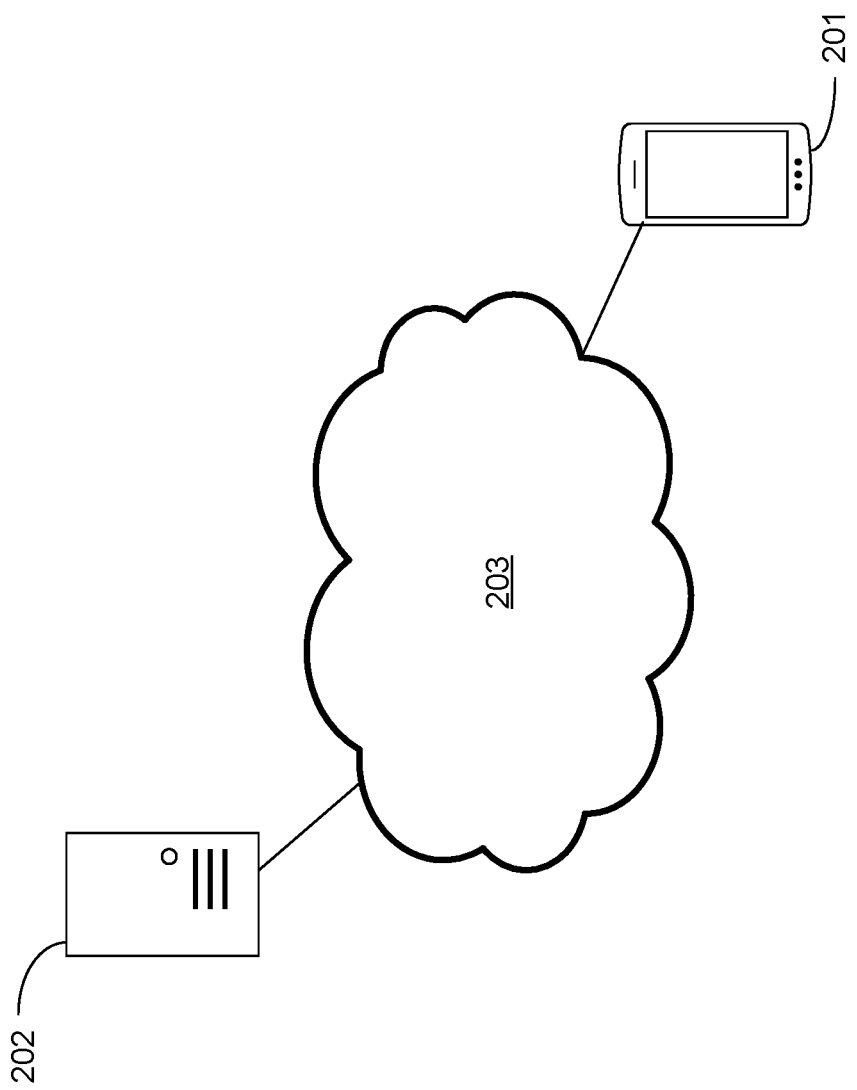
FIG. 1 illustrates an exemplary system that may implement disguising big data access patterns and frequencies.

FIG. 1 illustrates an exemplary system that may implement hiding big data access patterns and frequencies. End device 201 may be communicatively connected with server 202 via network 203. Network 203 may be a wireless or wireline communication network and may include a plurality of routing or other devices (not shown). End device 201 may include a laptop, desktop, smartphone, or other computing device. End device 201 may be used to send or receive information from server 202 or another device (not shown).

Figure 2A:
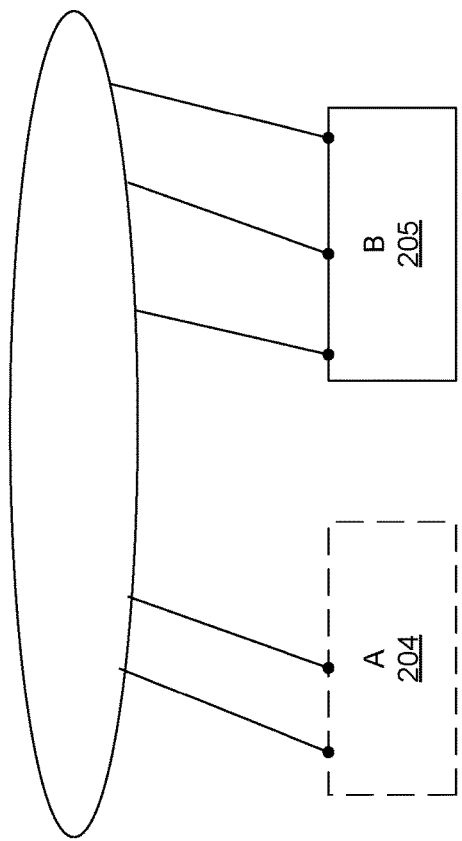
FIG. 2A illustrates an exemplary access pattern.
Figure 2B:
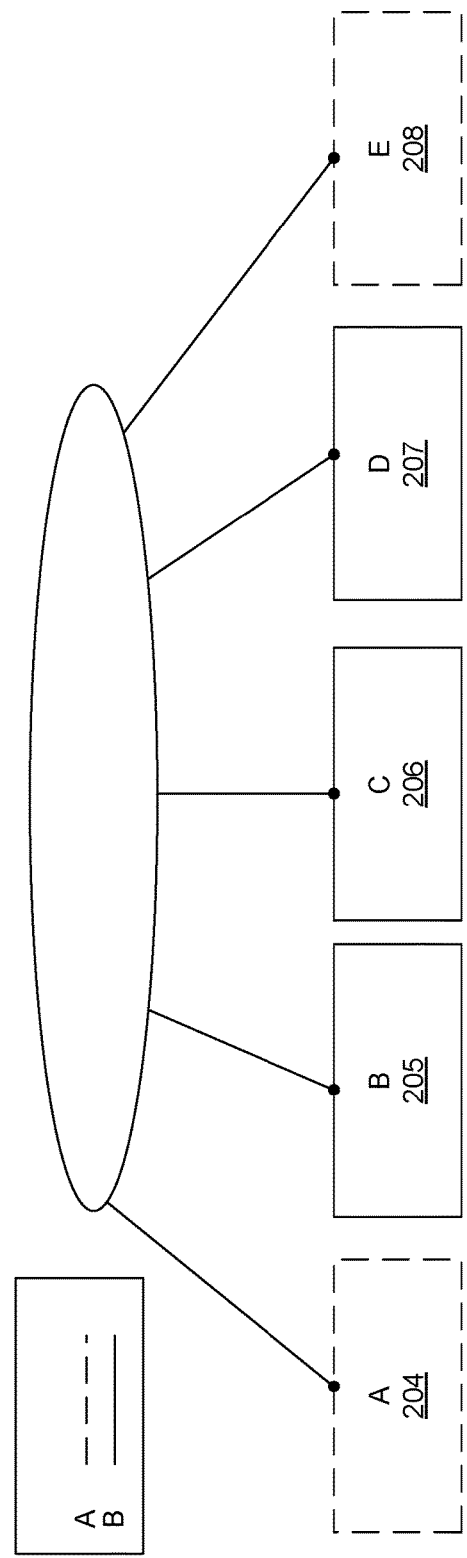
FIG. 2B illustrates an exemplary access pattern.

FIG. 2A and FIG. 2B illustrate exemplary access patterns. In FIG. 2A, there may be block 204 which corresponds to data object A (dotted lines) and block 205 which corresponds to data object B (solid line). As referenced herein, an adversary may be able to read the access frequency (e.g., A-B-B-B-A) and may be able to infer some information. In FIG. 2B, there may be block 204 which corresponds to data object A (dotted lines) and block 205 which corresponds to data object B (solid line). In addition, there may be block 208 (noted as E), which may be a replica of data object A. Also, there may be block 206 and block 207 (noted as C and D respectively), which may be a replica of data object B. As disclosed in more detail herein, replicas and fake accesses may be created in order to disguise data access patterns. Replicas may be considered copies of the content but with different addresses. For example, each replica of each content may be accessed with the same probability and the same frequency. In this case, the access pattern may be hidden and an adversary may observe A-B-C-D-E instead of A-B-B-B-A although functionally the same accesses are occurring.

Figure 3:
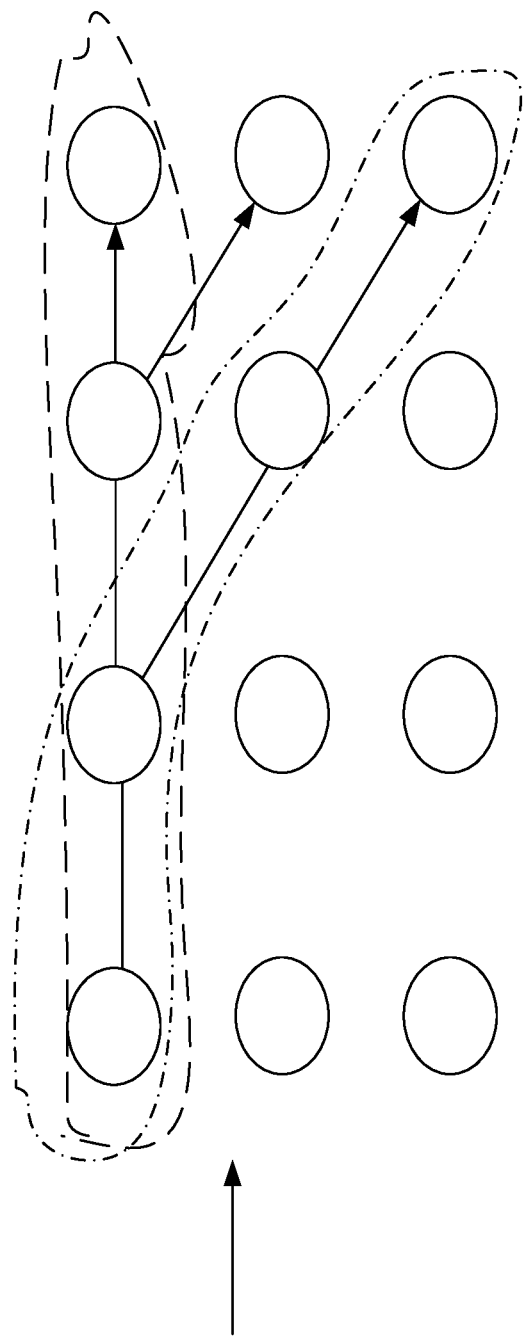
FIG. 3 illustrates an exemplary data structure for associating a key with a replica.

FIG. 3 illustrates an exemplary data structure for associating a key with a replica. In the description herein, the term "key" may be used to describe a unique identifier (ID) for referencing a piece of data (also referred herein as "data object"). The data structure may be a tree, in which a tree traversal process may be followed in order to obtain a specific replica associated with a given key. Each leaf node of the tree may directly point to a replica. So, there may be no need to store replica addresses separately. The tree traversal may be observed by an adversary and therefore leak information about the content accessed, but some tree designs may deter such leaks. A first way to deter leaks of information associated with tree traversal is to have each tree node connected to all nodes of the next level and each local branch is accessed with the same probability, which is a relatively expensive process. There is a less expensive way to design a tree. In the design of FIG. 3, the nodes are not fully connected to all nodes of the next level, however, existent end-to-end paths, some of which are denoted by dotted lines in FIG. 3, are equally probable.

Figure 4:
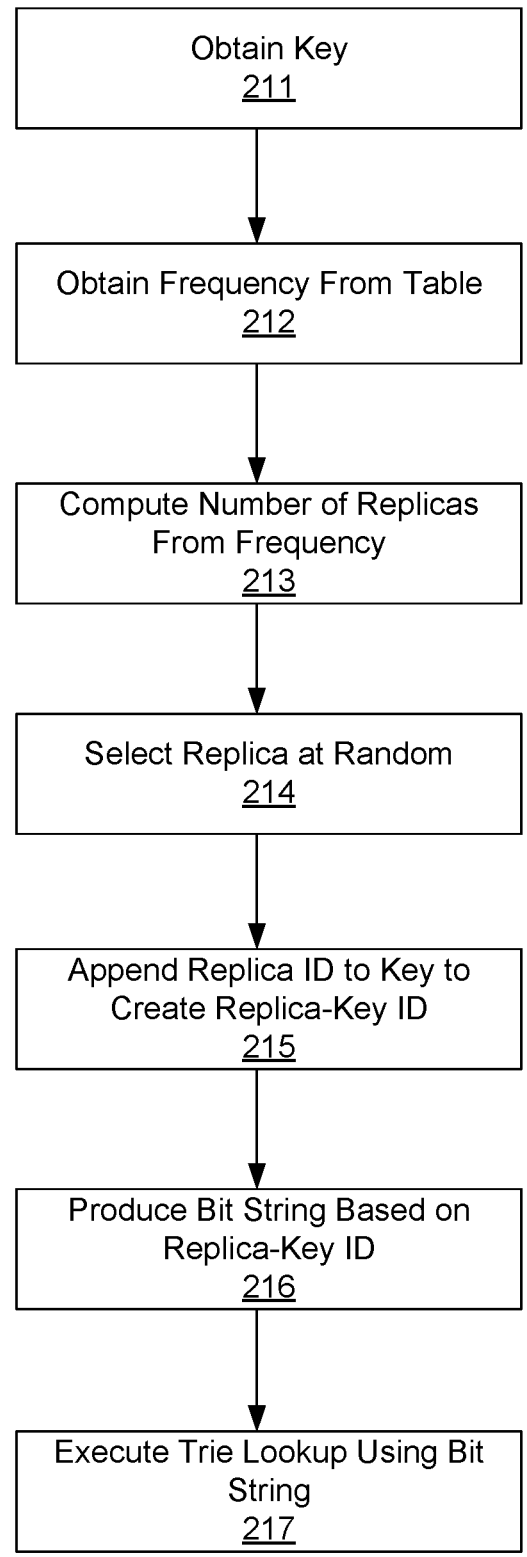
FIG. 4 illustrates an exemplary replica access procedure, which may use the tree of FIG. 3.

FIG. 4 illustrates an exemplary replica access procedure, which may use the tree of FIG. 3. At step 211, a key of an initial data object may be obtained. The term "key" may be used to describe a unique identifier (ID) for referencing a piece of data (also referred herein as "data object").

At step 212, an initial data object access frequency may be obtained, which may be from a table. Data object access frequencies for a period may be known and static. The data object access frequency may be stored in a table that is encrypted in order to protect the data object access frequency table. The access frequency to the table associated with initial data object access frequency may be observable by an adversary.

At step 213, based on the initial data object access frequency, determine the number of replicas associated with the data object that is read.

With continued reference to FIG. 4, at step 214, a replica index may be obtained based on a random number between 0 and number of replicas minus one.

At step 215, append replica index to the key to create replica-key ID.

At step 216, encrypt or truncate replica-key ID to produce a bit string. The replica index is appended to the key and the resulting replica-key ID may be encrypted and truncated. For additional perspective with regard to encryption and truncation, in a binary tree, such as in a trie, the leaf nodes are equal to 2 to the power of the height of the tree. For example, a tree of height 16 has 64K leaf nodes. Encryption produces a random number which is to be used as an index to a leaf node. Encryption systems, however, return many more bits than those needed to reference a leaf node. For example, encryption may be done using Advanced Encryption Standard (AES), which returns 128 pseudo-random bits. In the case of the tree of height 16, only 16 of those bits would need to be used, hence the truncation. In one example, a number of different permutations may need to be used for collision avoidance.

At step 217, the resulting bit string of step 216 may be used to perform a tree lookup, or more specifically a trie lookup on the tree (e.g., tree of FIG. 3, which is an example is a binary trie). The conversion of the bit string can be done with a cipher, block cipher, a one-way construction, a public key encryption scheme, components designed appropriately with cyclic redundancy check (CRC) code, or a number of other alternatives. For example a replica associated with number '45' of an object of key '15' may be stored in a leaf node of index '12'. The procedure of FIG. 4 would first append '45' to '15' creating the replica-key ID '1545'. This string would then get encrypted, becoming '8912' using some block cipher. Truncation would return '12' which is the index of the node where the replica '45' is stored.

The subject matter of FIG. 4 (e.g., step 211-step 217) provides for combining the IDs that define the key to be accessed and the replica number to be used in order to form an input to a random number generating process (e.g., the block encryption), the output of which may be used as an index to search a data structure. Also, further disclosed and contemplated is the combination of this index subject matter with the disclosed subject matter of random function simulating random accesses on the side and performing greedy mappings.

Figure 5:
FIG. 5 illustrates an exemplary method of how data object access frequencies may become associated with numbers of replicas.

FIG. 5 illustrates an exemplary method of how data object access frequencies may become associated with numbers of replicas, which is associated with step 213 of FIG. 4. At step 221, initial data object access frequency numbers which are associated with different data object accesses may be increased so the initial data object access frequency numbers become fq-based data object access frequency numbers, which may be multiples of some specific frequency quantum, f_q (or fq). The frequency quantum may be determined using one or more mathematical techniques, such as linear optimization, nonlinear optimization, or even trial and error, among other things. For simplicity, there may be access to object A and access to object B. For a period, the initial access to object A may have an initial data object access frequency of four (4). The initial access to object B may have an initial data object access frequency of eleven (11). So, in this particular case, the optimization technique would indicate that the frequency quantum is four. Therefore, there may be a need to change the initial data object access frequency numbers of the data objects so they are multiples of four in this case. Data object A already has an initial data object access frequency of four, so the initial data object access frequency of object A and fq-based data object access frequency of object A are the same (e.g., 4). Data object B has an initial data object access frequency of 11, therefore the fq-based data object access frequency may be twelve (12), which is an increase of 1 of the initial data object access frequency of data object B.

At step 222, there may be a determination regarding whether the total fq-based data object access frequency values (e.g., for data object A) is equal to the number of the leaf nodes in a tree, and the power of two if the tree is binary. In general, the sum of the fq-based data object access frequency values should be equal to the number of children of each node to a power equal to the height of the tree. If there is a determination that the leaf nodes in a tree, then step 221 and step 222 may be repeated or the number of leaf nodes may be increased. An example, with regard to the repeat, if the original frequencies are 5 and 15, and fq=5, then the sum 20 is not equal to a power of two. So there is a need to repeat the process setting eventually fq to 8. In this case the frequencies will be 8 and 24 and the number of leaf nodes is 32 (e.g., the leaves of a tree of height 5). In addition, there is a consideration of decreasing the initial fq.

At step 223, the ratio of each quantized frequency value over f_q may be the number of replicas assigned to a particular key. Here the number of replicas may be created based on the ratio. It may be assumed that the accesses of block 233 (e.g., k0, k1, k3, k6 etc.) are accesses determined by the procedure of FIG. 3, FIG. 4, or FIG. 5.

Figure 6:
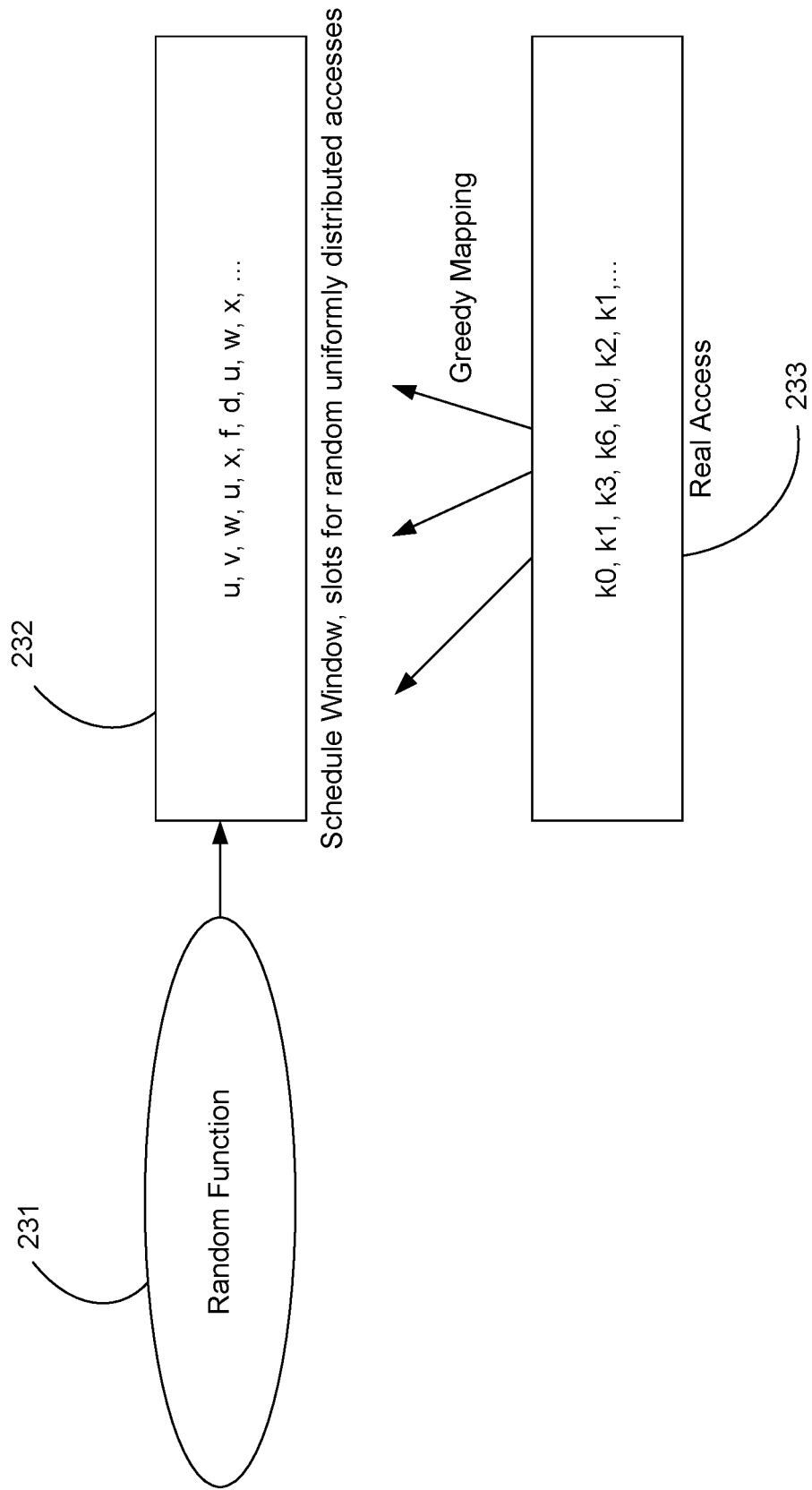
FIG. 6 illustrates an exemplary method for generating fake access by simulating a random function.

FIG. 6 illustrates an exemplary method for generating fake access by simulating a random function. The method may make accesses that occur with the real (e.g., actual) data object access frequencies appear as random and uniformly distributed, even if replica numbers are computed using the fq-based data object access frequencies. As shown in FIG. 6, there may be a random function 231, which may be a cryptographic primitive, that generates a schedule of random and uniformly distributed accesses. In an example in cryptography, a random function is a truncated output version of another primitive called the "random oracle." A random oracle may generate an infinite random uniformly distributed bit string for any given input. In reality, random functions may be approximated by one-way cryptographic hash functions such as Secure Hash Algorithm (SHA)-256, SHA-512, or SHA3. These systems, which are National Institute of Standards and Technology (NIST) standards, may be implemented in hardware and software.

With continued reference to FIG. 6, random function 231 may generate a schedule of random uniformly distributed accesses for some specific schedule window. The size of the window may be determined as part of a mathematical optimization process or trial and error. Block 232 is an example of the window and slots. Block 233 indicates real accesses that are mapped to slots (e.g., greedy mapping in step 242), which may be based on a greedy algorithm. Slots that are empty and do not participate in greedy mapping may be filled with fake accesses. Accesses are not random uniformly distributed because a schedule of real accesses is generated by the tree traversal process of FIG. 1 and FIG. 4 and the process that accesses the data object access frequency table of FIG. 5.

With reference to the method of FIG. 6, below is an example in which the simulated accesses in the window may look like the following: 3, 5, 6, 7, 9, 9, 12. The real accesses may look like the following respectively: 103, 105, 106, 109, 109, 109, 112. In this case two of the 109 s will be mapped to 2 of the 9 s. The third 109 will be pushed to the next window. The other real accesses will map each to a different simulated access. One simulated access, for example 7, will have no map and therefore will be the map of a fake access.

Figure 7A:
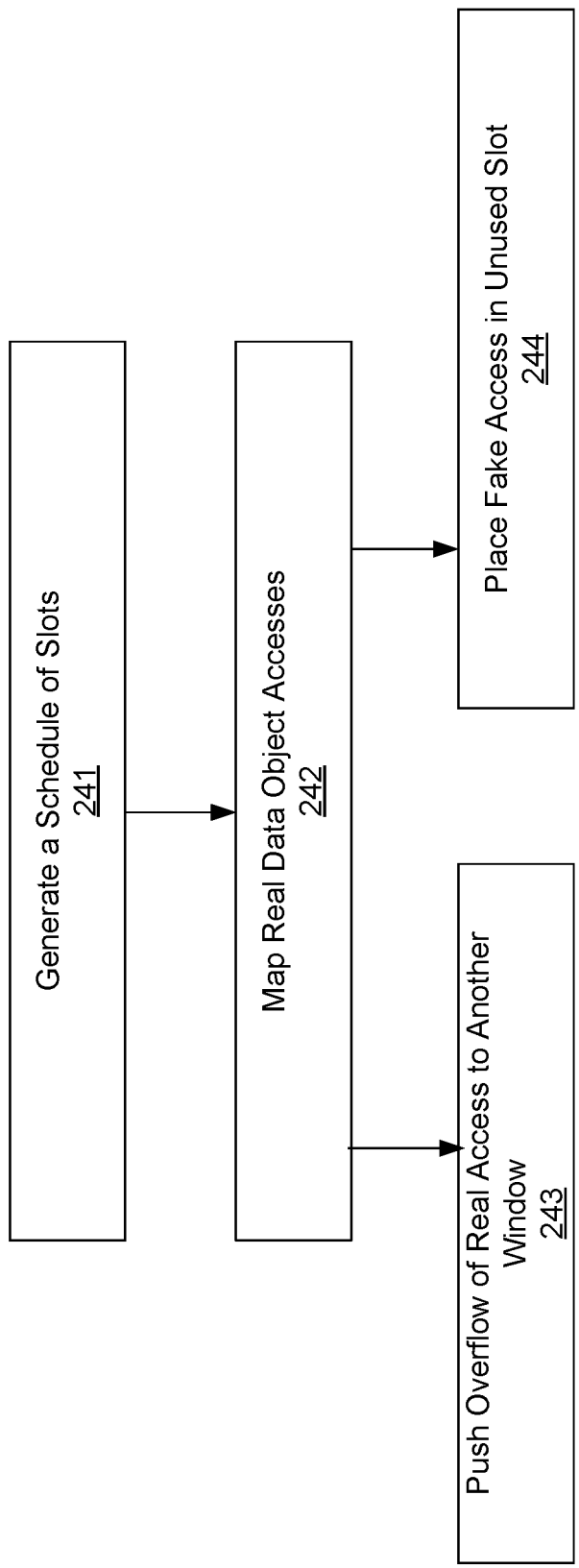
FIG. 7A illustrates an exemplary method associated with generating fake access.

FIG. 7A illustrates an exemplary method associated with generating fake access. At step 241, random function 231 may generate a schedule of slots (e.g., block 232). The schedule of slots may be used for random and uniformly distributed accesses. There are real accesses at block 233, which may include repetitions of K0, K1, K2, etc. For further perspective with regard to how the randomness may link to the data objects and fake accesses, slot IDs may be truly random uniformly distributed. The accesses to objects according to FIG. 3-FIG. 5 may not be, even though replicas are accessed as stated. The last step of FIG. 6 (e.g., determining if there is a need to insert even more accesses (fake this instance)) may be needed so as to make the visible pattern truly random.

At step 242, the real data object accesses (also referred herein as real accesses) may be mapped to the random slots generated at step 241. The most frequent may be mapped to the most frequent. See FIG. 7B for additional information with reference to step 242.

At step 243, when some of the real accesses do not have counterparts in the schedule (e.g., no mapping), the real access may be pushed to a slot in another schedule.

At step 244, when a window of schedule slots is not filled with real accesses, then a fake access is placed in the slot. Step 241-Step 244 may occur recursively. The schedule may be in accordance with the schedule of random function 231 and an optimization algorithm provides a frequency quantum and the size of the window in order to build the schedule and slots of accesses.

Figure 7B:
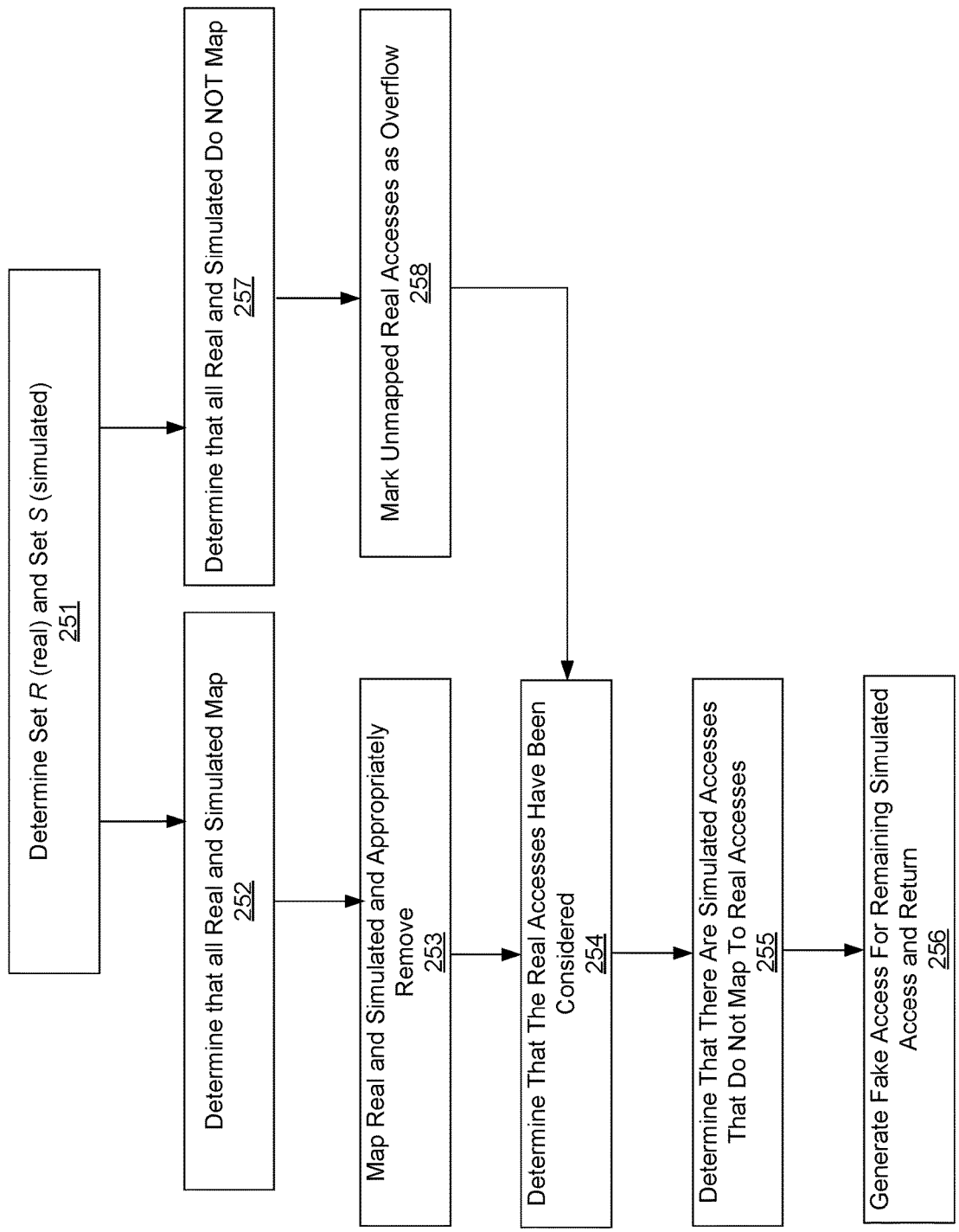
FIG. 7B illustrates an exemplary method associated with generating fake access.

FIG. 7B illustrates an exemplary method associated with generating fake access and greedy mapping process. At step 251, there may be a determining of the set R with the maximum number of repeated real accesses and the set S with the number of repeated simulated access that is the closest to the maximum number of repeated real accesses.

At step 252, there may be a determination that all the real accesses and simulated accesses map.

At step 253, based on step 252, the real accesses may be marked to simulated accesses and the mapped accesses may be removed in R and S from the sets of all real accesses and simulated accesses respectively.

At step 254, there may be a determination that the set of real accesses is empty, (e.g., determine that all the real accesses have been considered) and proceed to step 255. If not empty, then proceed to step 251 to repeat. At step 255, based on step 254, there may be a determination that there are simulated accesses that do not map to real accesses.

At step 256, based on step 255, generating one or more fake accesses for the remaining simulated accesses and then return.

At step 257 (which may follow step 251), there may be a determination that all the real accesses and simulated accesses do not map. Then, at step 258, the unmapped real accesses may be marked as 'overflow' accesses. The overflow accesses may be removed from R. The remaining real accesses may be mapped to simulated accesses and the mapped accesses in R and S may be removed from the sets of all real and simulated accesses respectively.

Data object accesses are accesses to replicas and may not be entirely uniformly distributed (unless otherwise addressed), as the numbers of replicas are computed from quantized frequencies. Data object access frequency table (also referred herein as frequency table) accesses may be out-of-cache accesses and may also be non-uniformly distributed. To make these accesses appear uniformly distributed, a greedy mapping process may be used to associate real data object accesses with simulated data object accesses.

Specifically, real data object accesses that have unique counterparts in a simulated schedule window may be scheduled to be performed in the current window. Real data object accesses without unique counterparts in the simulated schedule window may be scheduled to be performed in the next window of simulated random accesses. Simulated accesses that have no mappings (e.g., assignments) to real accesses are realized as fake accesses. For each fake access, a replica of a data object may be chosen at random, a read operation may be performed, and the returned content may be ignored.

For additional perspective, there may be a frequency that is 99 for 3 different access locations, in which an adversary after 10 million observed accesses may be able to figure out mathematically the hot spot because of this slight discrepancy between the real frequency, which is 99 and 100, which has been used for computing the different access locations. The disclosed subject matter may address this issue.

There are other implementations contemplated herein. In a first example, a result of the concatenation of the key and the replica index may be passed to a cryptographic hash function as opposed to a block cipher. Consider step 216, so instead of performing encryption, a cryptographic hash may be computed. In another example, the trie lookup step 217 may be replaced by a lookup on a different data structure. Data structures that may be used include, without being limited to, lookup tables, hash tables, linked lists, directed acyclic graphs, or heaps, among other things.

It is contemplated herein that the steps (e.g., FIG. 4 or FIG. 5) may be occur on one device (e.g., end device 201 or server 202) or over multiple devices (e.g., end device 201 and server 202).

Figure 8:
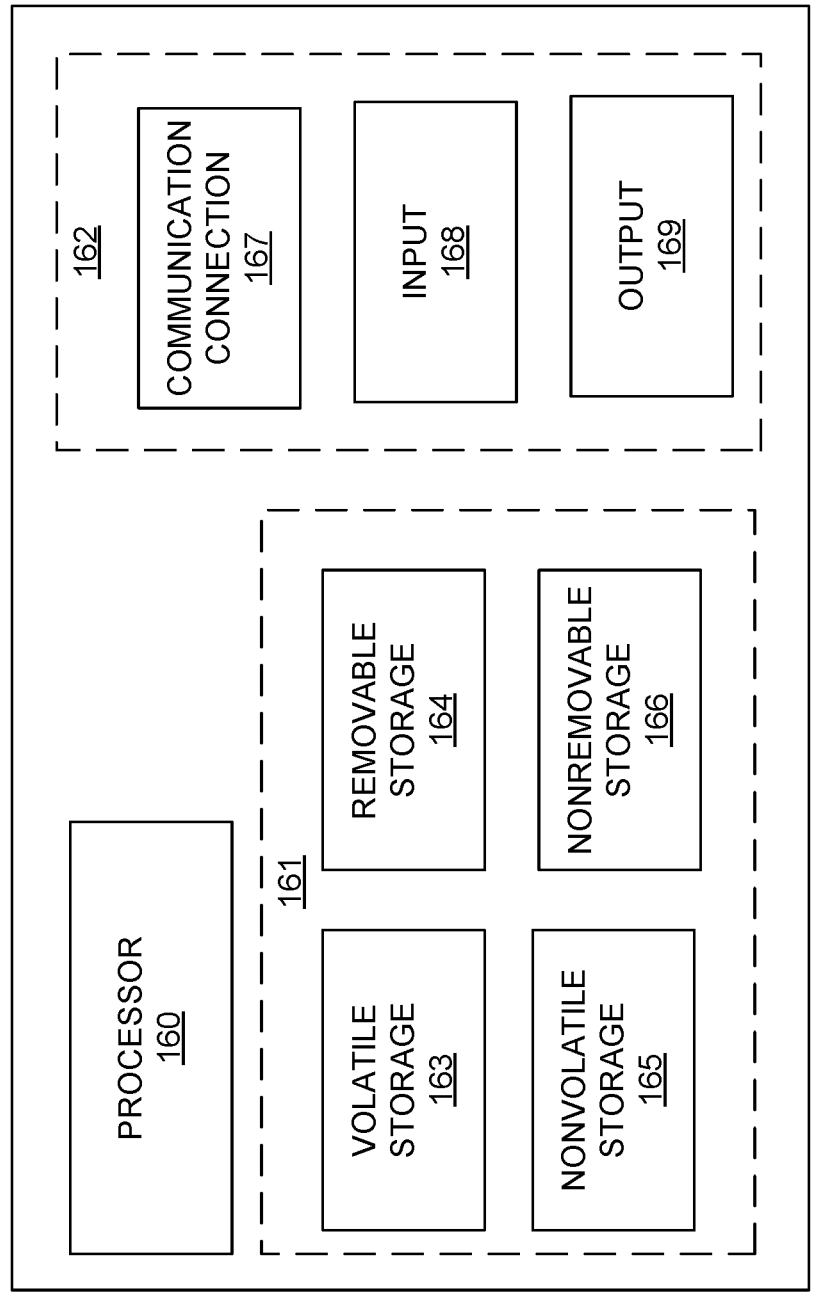
FIG. 8 illustrates an exemplary block diagram of a device.

FIG. 8 is an exemplary block diagram of a device, such as end device 201 or server 202. In an example, server 202 may include hardware or a combination of hardware and software. The functionality to facilitate telecommunications via a telecommunications network may reside in one or combination of devices. A device may represent or perform functionality of one or more devices, such as a component or various components of a cellular broadcast system wireless network, a processor, a server, a gateway, a node, a gaming device, or the like, or any appropriate combination thereof. It is emphasized that the block diagram depicted in FIG. 8 is exemplary and not intended to imply a limitation to a specific implementation or configuration. Thus, end device 201 or server 202, for example, may be implemented in a single device or multiple devices (e.g., single server or multiple servers, single gateway or multiple gateways, single controller or multiple controllers). Multiple network entities may be distributed or centrally located. Multiple network entities may communicate wirelessly, via hardwire, or any appropriate combination thereof.

End device 201, server 202, or another device may comprise a processor 160 or a memory 161, in which the memory may be coupled with processor 160. Memory 161 may contain executable instructions that, when executed by processor 160, cause processor 160 to effectuate operations associated with hiding big data access patterns and frequencies, or other subject matter disclosed herein.

In addition to processor 160 and memory 161, end device 201, server 202, or another device may include an input/output system 162. Processor 160, memory 161, or input/output system 162 may be coupled together (coupling not shown in FIG. 8) to allow communications between them. Each portion of end device 201, server 202, or another device may include circuitry for performing functions associated with each respective portion. Thus, each portion may include hardware, or a combination of hardware and software. Input/output system 162 may be capable of receiving or providing information from or to a communications device or other network entities configured for telecommunications. For example, input/output system 162 may include a wireless communications (e.g., Wi-Fi, Bluetooth, or 5G) card. Input/output system 162 may be capable of receiving or sending video information, audio information, control information, image information, data, or any combination thereof. Input/output system 162 may be capable of transferring information with end device 201, server 202, or another device. In various configurations, input/output system 162 may receive or provide information via any appropriate means, such as, for example, optical means (e.g., infrared), electromagnetic means (e.g., radio frequency (RF), Wi-Fi, Bluetooth), acoustic means (e.g., speaker, microphone, ultrasonic receiver, ultrasonic transmitter), or a combination thereof. In an example configuration, input/output system 162 may comprise a Wi-Fi finder, a two-way Global Positioning System (GPS) chipset or equivalent, or the like, or a combination thereof.

Input/output system 162 of end device 201, server 202, or another device also may include a communication connection 167 that allows end device 201, server 202, or another device to communicate with other devices, network entities, or the like. Communication connection 167 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 162 also may include an input device 168 such as keyboard, mouse, pen, voice input device, or touch input device. Input/output system 162 may also include an output device 169, such as a display, speakers, or a printer.

Processor 160 may be capable of performing functions associated with telecommunications, such as functions for processing broadcast messages, as described herein. For example, processor 160 may be capable of, in conjunction with any other portion of end device 201, server 202, or another device, determining a type of broadcast message and acting according to the broadcast message type or content, as described herein.

Memory 161 of end device 201, server 202, or another device may comprise a storage medium having a concrete, tangible, physical structure. As is known, a signal does not have a concrete, tangible, physical structure. Memory 161, as well as any computer-readable storage medium described herein, is not to be construed as a signal. Memory 161, as well as any computer-readable storage medium described herein, is not to be construed as a transient signal. Memory 161, as well as any computer-readable storage medium described herein, is not to be construed as a propagating signal. Memory 161, as well as any computer-readable storage medium described herein, is to be construed as an article of manufacture.

Herein, a computer-readable storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), random-access memory (RAM)-drives, SECURE DIGITAL cards or drives, any other suitable computer-readable non-transitory storage media, or any suitable combination of two or more of these, where appropriate. A computer-readable storage medium may be volatile, non-volatile, or a combination of volatile and non-volatile, where appropriate.

It is to be understood that the methods and systems described herein are not limited to specific methods, specific components, or to particular implementations. It is also to be understood that the terminology used herein is for the purpose of describing particular examples only and is not intended to be limiting.

While the disclosed systems have been described in connection with the various examples of the various figures, it is to be understood that other similar implementations may be used or modifications and additions may be made to the described examples of hiding big data access patterns and frequencies, among other things as disclosed herein. For example, one skilled in the art will recognize that hiding big data access patterns and frequencies, among other things as disclosed herein in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—hiding big data access patterns and frequencies—as illustrated in the Figures, specific terminology is employed for the sake of clarity. The claimed subject matter, however, is not intended to be limited to the specific terminology so selected.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another example includes from the one particular value or to the other particular value. Similarly, when values are expressed as approximations, by use of the antecedent "about," it will be understood that the particular value forms another example. All ranges are inclusive and combinable. It is to be understood that the terminology used herein is for the purpose of describing particular aspects only and is not intended to be limiting.

This written description uses examples to enable any person skilled in the art to practice the claimed subject matter, including making and using any devices or systems and performing any incorporated methods. Other variations of the examples are contemplated herein. It is to be appreciated that certain features of the disclosed subject matter which are, for clarity, described herein in the context of separate examples, may also be provided in combination in a single example. Conversely, various features of the disclosed subject matter that are, for brevity, described in the context of a single example, may also be provided separately or in any sub-combination. Further, any reference to values stated in ranges includes each and every value within that range. Any documents cited herein are incorporated herein by reference in their entireties for any and all purposes.

The scope of this disclosure encompasses all changes, substitutions, variations, alterations, and modifications to the examples described or illustrated herein that a person having ordinary skill in the art would comprehend. The scope of this disclosure is not limited to the examples described or illustrated herein. Moreover, although this disclosure describes and illustrates respective examples herein as including particular components, elements, feature, functions, operations, or steps, any of these examples may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular examples as providing particular advantages, particular examples may provide none, some, or all of these advantages.

Methods, systems, and apparatuses, among other things, as described herein may provide for hiding big data access patterns and frequencies. A method, system, computer readable storage medium, or apparatus may provide for receiving a key of a first data object; receiving a frequency number for an initial data object access within a period; based on the frequency number, determine a number of replicas associated with the first data object; obtaining a replica index based on a random number; appending the replica index to the key to create replica-key identifier (ID); creating a bit string based on the replica-key ID; and performing a trie lookup on a search tree. A method, system, computer readable storage medium, or apparatus may provide for receiving a key of a first data object; receiving a frequency number for an initial data object access within a period; based on the frequency number, determine a number of replicas associated with the first data object; obtaining a replica index based on a random number; appending the replica index to the key to create replica-key identifier (ID); creating a bit string based on the replica-key ID; and based on the bit string, performing a lookup on data structure. The data structure may include a search tree, lookup tables, hash tables, linked lists, directed acyclic graphs, or heaps, among other things. The frequency number may be obtained from a table of frequency numbers for a plurality of data objects. The random number is between zero and the number of replicas minus one. The creating the bit string may include encrypting and truncating the replica-key ID. A lookup may be performed based on the schedule. The frequency number may be a multiple of a frequency quantum. All combinations in this paragraph and the following paragraph (including the removal or addition of steps) are contemplated in a manner that is consistent with the other portions of the detailed description.

The apparatus may include an artificial reality device, server, mobile phone, or other device. Methods, systems, and apparatuses, among other things, as described herein may provide for generating a schedule of a set of simulated accesses based on a random function associated with the replica-key ID; determining a mapping of a set of real accesses to the set of simulated accesses; determining, based on the mapping of the set of real accesses to the set of simulated accesses, an open slot not mapped to a simulated access of the set of simulated accesses; and based on the determining the open slot, mapping a fake access to the simulated access. Simulated accesses that have no mappings (e.g., assignments) to real accesses may be realized as fake accesses. For each fake access, a replica of a data object may be chosen at random, a read operation may be performed, and the returned content may be ignored. Methods, systems, and apparatuses, among other things, as described herein may provide for generating a schedule of a set of simulated data object accesses (which may be randomized); determining a mapping of a set of real data object accesses to the set of simulated data object accesses; determining, based on the mapping of the set of real data object accesses to the set of simulated data object accesses, an unused slot associated with a simulated data object access not being mapped; based on the determining of the unused slot, selecting, based on a random function, a fake data object access to map to the simulated data object access, wherein the fake data object access is associated with the replica-key ID. All combinations in this paragraph and the above paragraphs (including the removal or addition of steps) are contemplated in a manner that is consistent with the other portions of the detailed description.

What is claimed:

1. An apparatus comprising:
   one or more processors; and
   a memory coupled with the one or more processors, the memory storing executable instructions that when executed by the one or more processors cause the apparatus to:
   receive a key of a first data object;
   receive a frequency number associated with an initial data object access within a period;
   determine a number of replicas associated with the first data object, based on the frequency number;
   obtain a replica index based on a random number;
   append the replica index to the key to create a replica-key identifier (ID);
   create a bit string based on the replica-key ID;
   generate a schedule of a set of simulated data object accesses based on a first random function associated with the replica-key ID; and
   perform a first look up on a first data structure based on the schedule.

2. The apparatus of claim 1, wherein when the one or more processors further execute the instructions, the apparatus is configured to:
   perform a second look up on a second data structure, based on the bit string.

3. The apparatus of claim 1, wherein when the one or more processors further execute the instructions, the apparatus is configured to:
   determine a mapping of a set of real data object accesses to the set of simulated data object accesses;
   determine, based on the mapping of the set of the real data object accesses to the set of the simulated data object accesses, an unused slot associated with a simulated data object access not being mapped; and
   select a fake data object access to map to the simulated data object access, based on the determine of the unused slot.

4. The apparatus of claim 3, wherein the select is based on a second random function.

5. The apparatus of claim 2, wherein the first data structure comprises a search tree, a lookup table, a hash table, linked lists, a directed acyclic graph, or heaps.

6. The apparatus of claim 1, wherein the frequency number is obtained from a table of frequency numbers associated with a plurality of data objects.

7. The apparatus of claim 2, wherein the create the bit string comprises encrypting and truncating the replica-key ID.

8. The apparatus of claim 1, wherein the frequency number is a multiple of a frequency quantum.

9. The apparatus of claim 8, wherein the frequency quantum is determined using linear optimization or nonlinear optimization.

10. A method comprising:
    receiving a key of a first data object;
    receiving a frequency number associated with an initial data object access within a period;
    determining a number of replicas associated with the first data object, based on the frequency number;
    obtaining a replica index based on a random number;
    appending the replica index to the key to create a replica-key identifier (ID);
    creating a bit string based on the replica-key ID; and
    generating a schedule of a set of simulated data object accesses based on a first random function associated with the replica-key ID.

11. The method of claim 10, further comprising:
    performing a lookup on a data structure, based on the bit string.

12. The method of claim 10, further comprising:
    determining a mapping of a set of real data object accesses to the set of the simulated data object accesses;
    determining, based on the mapping of the set of the real data object accesses to the set of simulated data object accesses, an unused slot associated with a simulated data object access not being mapped; and
    selecting a fake data object access to map to the simulated data object access, based on the determining of the unused slot.

13. The method of claim 12, wherein the selecting is based on a second random function.

14. The method of claim 11, wherein the data structure comprises a search tree, a lookup table, a hash table, linked lists, a directed acyclic graph, or heaps.

15. The method of claim 10, wherein the frequency number is obtained from a table of frequency numbers associated with a plurality of data objects.

16. The method of claim 11, wherein the creating the bit string comprises encrypting and truncating the replica-key ID.

17. A computer-readable storage medium storing computer executable instructions that when executed by a computing device causes the computing device to effectuate operations comprising:
    receiving a key of a first data object;
    receiving a frequency number associated with an initial data object access within a period;
    determining a number of replicas associated with the first data object, based on the frequency number;
    obtaining a replica index based on a random number;

appending the replica index to the key to create a replica-key identifier (ID);

creating a bit string based on the replica-key ID; and generating a schedule of a set of simulated data object accesses based on a first random function associated with the replica-key ID.

18. The computer-readable storage medium of claim 17, wherein when the instructions are further executed by the computing device causes the computing device to effectuate operations comprising:

determining a mapping of a set of real data object accesses to the set of simulated data object accesses;

determining, based on the mapping of the set of the real data object accesses to the set of the simulated data object accesses, an unused slot associated with a simulated data object access not being mapped; and selecting a fake data object access to map to the simulated data object access, based on the determining of the unused slot.

19. The computer-readable storage medium of claim 18, wherein the selecting is based on a second random function.

20. The computer-readable storage medium of claim 17, wherein when the instructions are further executed by the computing device causes the computing device to effectuate operations comprising:

performing a lookup on a data structure, based on the bit string.

* * * * *